United States Patent [19]

Sassen et al.

[11] Patent Number: 5,972,412
[45] Date of Patent: *Oct. 26, 1999

[54] NATURAL TRIGLYCERIDE FATS

[75] Inventors: Cornelis Laurentius Sassen, Schiedam; Robert Schijf, Vlaardingen; Adriaan Cornelis Juriaanse, Berkel en Rodenrijs, all of Netherlands

[73] Assignee: Van den Bergh Foods Company, Division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,654

[22] Filed: Aug. 22, 1997

Related U.S. Application Data

[63] Continuation of application No. 08/607,815, Feb. 27, 1996, abandoned, which is a continuation of application No. 08/301,824, Sep. 7, 1994, abandoned.

[30] Foreign Application Priority Data

Sep. 14, 1993 [EP] European Pat. Off. ............... 93307251
Oct. 20, 1993 [EP] European Pat. Off. ............... 93202942

[51] Int. Cl.$^6$ ....................................................... A23D 7/00
[52] U.S. Cl. ........................................... 426/603; 426/607
[58] Field of Search .................................... 426/607, 608, 426/603

[56] References Cited

U.S. PATENT DOCUMENTS

| | | | |
|---|---|---|---|
| 4,360,536 | 11/1982 | Keuning | 426/607 |
| 4,366,181 | 12/1982 | Dykshoorn | 426/607 |
| 4,390,561 | 6/1983 | Blair | 426/607 |
| 4,438,149 | 3/1984 | Verhagan | 426/607 |
| 4,791,000 | 12/1988 | Holemans | 426/606 |
| 4,960,544 | 10/1990 | Van Putte | 426/601 |
| 5,045,243 | 9/1991 | Kuwabara | 260/428.5 |
| 5,231,200 | 7/1993 | Kuwabara | 554/191 |
| 5,393,906 | 2/1995 | Price | 426/601 |

FOREIGN PATENT DOCUMENTS

| | | |
|---|---|---|
| 686540 | 7/1964 | Canada . |
| 089082 | 3/1983 | European Pat. Off. . |
| 369519 | 11/1989 | European Pat. Off. . |
| 470658 | 7/1991 | European Pat. Off. . |
| 2660160 | 12/1990 | France . |
| 433939 | 4/1967 | Switzerland . |
| 2239256 | 12/1990 | United Kingdom . |
| 2244717 | 5/1991 | United Kingdom . |
| 91/08677 | 6/1991 | WIPO . |

OTHER PUBLICATIONS

Borwankar 1992 Rheological Characterication of Melting of Margarines and Tablespreads J. Food Engineering 16: 55–74.
Gunstone 1983 Lipids in Foods Chemistry, Biochemistry and Technology Pergamon Press New York pp. 140–142, 152–154.

Primary Examiner—Carolyn Paden
Attorney, Agent, or Firm—Matthew Boxer

[57] ABSTRACT

Glyceride fat which comprises a mixture of glycerides originating from seed oils which have not substantially been subjected to chemical modification, which glycerides are derived from fatty acids which comprise (a) at least 10 wt. % of $C_{18}$–$C_{24}$ saturated fatty acids
(b) which comprise stearic and/or arachidic and/or behenic acid and/or lignoceric acid
(c) oleic and/or linoleic acid, while
(d) the ratio of saturated $C_{18}$-acid /saturated $(C_{20}+C_{22}+C_{24})$-acids $\geq 1$, preferably $\geq 5$, more preferably $\geq 10$, which glycerides contain calculated on total fatty acid weight (e) $\leq 5$ wt. % of linolenic acid
(f) $\leq 5$ wt. % of trans fatty acids
(g) $\leq 75$ wt. %, preferably $\leq 60$ wt. % of oleic acid on total fatty acids on position 2 of the glyceride molecule which glycerides contain calculated on total glycerides weight (h) $\geq 8$ wt. % HOH+HHO triglycerides
(i) $\leq 5$ wt. % of trisaturated triglycerides
(j) which glycerides have a solids content comprising $N_{10}>10$ and $N_{35}\leq 15$ and which is characterised in that the ratio of (HOH+HHO) and (HLH+HHL) triglycerides >1, where H is a saturated $C_{18}$–$C_{24}$ fatty acid residue, O is an oleic acid residue and L is a linoleic acid residue.

21 Claims, No Drawings

NATURAL TRIGLYCERIDE FATS

This is a Continuation application of Ser. No. 08/607,815, filed Feb. 27, 1996, now abandoned, which is a Continuation application of Ser. No. 08/301,824, filed Sep. 7, 1994, now abandoned.

The present invention deals with triglyceride fats which have not substantially been subjected to chemical modification treatments and which are suitable for the manufacture of shortenings, margarine and other plastic compositions containing edible fats.

The modern consumer consciously selects his food and preferably chooses products which help him maintaining good health and physical condition. If there is a choice, some consumers prefer products which have been obtained by manufacturing methods which use no or little chemical treatments.

Triglyceride fats are a component of many food products. They may be a natural component of the product, as in butter, or they have been added deliberately. Triglyceride fats as they exist in nature often lack properties deemed important for the preparation of food products of high quality with respect to consistency, taste and health.

Margarine fats, for example, in the first place should contain enough solids to impart a spreadable consistency to the product obtained by emulsifying the fat with a water phase. Although some animal fats may be suitable in this respect, they are avoided because a considerable consumption of these fats is believed to contribute to developing cardiovascular diseases.

On the other hand vegetable fats, which are cheap and are abundantly available, generally are liquid and should be hardened to make them suitable as a margarine fat. Vegetable fats and particularly marine oils often contain glycerides of highly unsaturated fatty acids which are prone to oxidation and then develop unacceptable off-flavours. Hardening may change the unsaturated fatty acids to saturated or more saturated fatty acids. However, the hardening process to some extent generates fatty acids with trans double bonds. Many consumers wish to control the amounts of these trans fatty acids as well as of fully saturated fatty acids in their diet.

There is therefore a need for triglyceride fats which on one side are natural, or "green", which means that they have not or hardly been subjected to chemical modification treatments and which contain low contents of trans fatty acids and of highly unsaturated fatty acids, particularly linolenic acid and which, on the other side, contain enough solids to allow the manufacture of margarine and shortenings. The need for solids should be balanced against a desired low level of intermediate chain ($C_{12}$–$C_{16}$) saturated fatty acids. An ideal oil after its isolation from a plant and after purification could be used immediately without any chemical modification in a margarine manufacturing process.

Such fats are described in EP 0 369 519 (UNILEVER). However, such fats show a steep N-line which, departing from a high value at 10° C. quickly drops to unacceptable low levels at 20–25° C. It should be noted that the ratio of H2O and H2L triglycerides is 1 or less.

In this specification H stands for $C_{18}$–$C_{24}$ saturated fatty acid residues, S for stearic acid residue, O for oleic acid residue and L for linoleic acid residue.

In GB 2 239 256 (KRAFT) dealing with the production of margarine oils the use of SOS triglycerides for margarine manufacture is dissuaded in favour of SLS triglycerides. However, an actual disclosure of a margarine manufacturing process is lacking.

WO 91/08677 (KRAFT) refers to glyceride fats obtained by interesterification which contain H2O and H2L triglycerides at a ratio which is <0.5.

STATEMENT OF INVENTION

The invention provides a glyceride fat which comprises a mixture of glycerides originating from seed oils which have not substantially been subjected to chemical modification, which glycerides are derived from fatty acids which comprise (a) at least 10 wt. % of $C_{18}$–$C_{24}$ saturated fatty acids
(b) which comprise stearic and/or arachidic and/or behenic acid and/or lignoceric acid and
(c) oleic and/or linoleic acid, while
(d) the ratio of saturated $C_{18}$-acid/saturated ($C_{20}$+$C_{22}$+$C_{24}$)-acids $\geq 1$, preferably $\geq 5$, more preferably $\geq 10$, which glycerides contain (e) $\leq 5$ wt. % of linolenic acid calculated on total fatty acid weight
(f) $\leq 5$ wt. % of trans fatty acids calculated on total fatty acid weight
(g) $\leq 75$ wt. %, preferably $\leq 60$ wt. % of oleic acid on total fatty acids on position 2 of the glyceride molecule:

which glycerides contain calculated on total glycerides weight (h) $\geq 8$ wt. % HOH+HHO triglycerides
(i) $\leq 5$ wt. % of trisaturated triglycerides weight which glycerides have (j) a solids content comprising $N_{10}>10$ and $N_{35}\leq 15$ and which is characterised in that the ratio of (HOH+HHO) and (HLH+HHL) triglycerides is >1, preferably >1.2.

The mixture comprises a hardstock component which preferably is selected from the stearin fractions of dry fractionated sheanut oil and dry fractionated high stearic soybean oil.

Fats characterised by the above features have a relatively high SOS content. They are very suitable to be used as the fat component of plastic edible fat containing compositions, particularly spreads, which are believed to be health supporting and which have good consistency, spreadability over the relevant temperature range and mouth melting properties.

DETAILED DESCRIPTION

The fats of the invention originate from plant seeds. According to a special embodiment the fat is obtained, in whole or in part, from soybean, corn, olive, rape, safflower or sunflower plants which have been genetically modified and, optionally, further selected using known breeding methods.

After harvesting the oil may be used without any treatment other than the usual oil refining treatments comprising degumming, bleaching and deodorisation. More often, however, in order to obtain an oil which satisfies the definition in this specification, the oils need at least one modification treatment comprising fractionation or interesterification or blending. For obtaining an optimum mix of triglycerides the fat of course may be blended with other fats which also have not been chemically modified and therefore qualify as "green". Fats suitable for blending comprise sunflower oil, rapeseed oil, corn oil, shea oil, regular soybean oil, high stearic soybean oil and fractions thereof. In the context of this patent specification high stearic soybean oil is defined as soybean oil with an increased content of stearic acid exceding 10 wt. % stearic acid.

Also two or more of such treatments may be combined.

Because the fats are claimed to have not substantially been subjected to chemical modification, solvent fractionation is excluded as well as chemical interesterification processes. But dry fractionation and enzymatic interesterification processes are allowed, because these are natural and not considered as chemical modifications. Hydrogenation is allowed too, provided that not more than 10 wt. %, preferably not more than 5 wt. % of the fat blend has been subjected to hydrogenation. Such fat blends are considered as having not substantially been subjected to chemical modification.

In the context of this specification the terms oils and fats are used without discrimination, with the proviso that oils are fats which are liquid at ambient temperature.

As said before, many consumers wish to restrict the intake of fat with much intermediate chain ($C_{12}$–$C_{16}$) saturated fatty acids. Therefore the fat of the invention has a content of $C_{12}$–$C_{16}$ fatty acids which preferably is $\leq 15$ wt. %, more preferably $\leq 10$ wt. % and still more preferably $\leq 5$ wt. %, calculated on total fatty acid weight.

The amount of saturated fatty acids to a large extent determines the solids content of the fat. For structuring the fat a minimum amount of solids has to be present. Therefore the fat contains $\geq 10$ wt. %, preferably $\geq 15$ wt. %, more preferably $\geq 20$ wt. % of saturated fatty acids calculated on total fatty acids weight.

The saturated fatty acids comprise stearic and/or arachidic and/or behenic acid and/or lignoceric acid, with the proviso that the ratio of saturated $C_{18}$-acid/saturated ($C_{20}$+$C_{22}$+$C_{24}$)-acids is $\geq 1$, preferably $\geq 5$ and more preferably $\geq 10$.

The unsaturated fatty acids supplementing the saturated ones comprise oleic and/or linoleic acid and $\leq 5$ wt. % of linolenic acid, with the proviso that $\leq 5$ wt. % of trans fatty acids is present.

By trans fatty acid is meant an unsaturated fatty acid having a carbon chain length of from 16–24 carbon atoms and having at least one unsaturated carbon—carbon bond which is in trans-configuration.

The weight percentage of trans fatty acids is determined in accordance with AOCS official test Cd 14–61 (1984).

The weight percentage of fatty acid moieties as mentioned in this specification is calculated on total weight of fatty acid moieties in the triglyceride or glyceride composition, unless indicated otherwise.

AOCS official method Ce 1–62 (81) may be used to determine the weight percent of respective fatty acid moieties of a margarine oil.

The weight percentage of triglycerides as mentioned in this specification is calculated on total weight of triglycerides in the glyceride composition, unless indicated otherwise.

Not more than 75 wt. %, preferably not more than 60 wt. % of the fatty acids on position Sn2 consists of oleic acid.

The amount of trisaturated triglycerides (HHH) should be restricted to $\leq 5$ wt. %.

With regard to the unsaturated triglycerides the fats of the invention are characterised by an amount of $\geq 8$ wt. %, preferably $\geq 12$ wt. % of HOH+HHO triglycerides, while the ratio of (HOH+HHO) triglycerides and (HLH+HHL) triglycerides should be >1, preferably >1.2. More preferably such ratio is 1-9 and still more preferably 1.2-4.

This feature is a deviation of prior art fats having a ratio H2O/H2L <1, which feature unexpectedly enables the production of spreads which have a good spreadability over the relevant range of 5°–20° C. as well as a good melting behaviour. The relatively high H2O/H2L ratio enables the reduction of the amount of hardstock, a generally less desired fat component with much saturated triglycerides, and the use of relatively more unsaturated oils, which are better available and preferred from a nutritional point of view. Notwithstanding the reduced amount of hardstock the $N_{20}$-value remains substantially unchanged and emulsified products made of the oils have good Stevens values.

The low level of HHH-glycerides and the melting line of the HOH-glycerides contribute to the excellent melting and spreading behaviour of the present fat blend.

A particularly preferred fat according to the invention has additional to the general features mentioned hereinbefore the following composition features <8 wt. % $C_{12}$–$C_{16}$ fatty acids >25 wt. % stearic acid <5 wt. % saturated $C_{20}$+$C_{22}$+$C_{24}$ fatty acids the balance essentially being oleic and linoleic acid.

The fats of the invention mainly consist of triglycerides but they may contain diglycerides and monoglycerides too.

Because the presence of disaturated diglycerides has a negative impact on the crystallisation behaviour of glyceride fats, their preferred content in the fat, is rather low and comprises $\leq 5$ wt. %, more preferably $\leq 3$ wt. % of disaturated diglycerides calculated on total glycerides weight.

Blending triglyceride fats has already been mentioned as a suitable way to obtain the fats comprised by the invention. Suitable blends may be made from e.g. the stearin fraction of dry fractionated sheanut oil as hardstock which is blended with sunflower oil and, optionally, with high stearic soybean oil. A preferred hardstock is the stearin fraction of high stearic soybean oil.

Surprisingly it has been found that the stearin fraction of dry fractionated high stearic soybean oil contains a high level of HLH triglycerides. No natural source of HLH triglycerides was known before. By combining this HLH source with a natural HOH source, such as the stearin fraction of dry fractionated sheanut oil, in varying amounts and ratios the N-line of the resulting fat blend can be greatly manipulated as to level and steepness.

The amounts of the various oils constituting the blend should be chosen such that the final blend satisfies the specification of the oil as defined according to the invention.

Alternatively, the glyceride fats of the invention may be obtained wholly or partially from genetically modified seed bearing plants, such as soybean, corn, olive, rape, safflower or sunflower plants.

The glyceride fats of the invention may be used for manufacturing plastic edible fat containing compositions, particularly spreads. These are understood to include compositions comprising 1–100% fat phase and 0–99% aqueous phase, which include margarine, spreads containing <80% fat, shortenings and bakery fats.

Preferably the composition comprises 40–80% of fat phase and 20–60% of aqueous phase.

The spreads may be prepared with conventional processes, for example, those described in EP 0 089 082.

The fats of the invention have N-lines with $N_{10}$>10 and $N_{35}\leq 15$. Preferably, they comply with solid fat contents desired for fats suitable for manufacturing spreads, particularly tub margarine, wrapper margarines and bakery margarines. For exhibiting good quick melting properties when starting with a firm consistency at refrigerator temperature preferably the difference of $N_5$ and $N_{20}$ values is at least 10.

For tub margarines the preferred solids content ($N_T$) is
at 10° C. 11 to 30
at 20° C. 4 to 15
at 30° C. 0.5 to 8
at 35° C. 0 to 4

The obtained margarine shows quick melting behaviour in the mouth. In this respect they exceed the performance of commercially available margarines of which the fat blend comprises a mixture of hydrogenated and/or chemically interesterified components.

For wrapper margarine the preferred solids content ($N_T$) is
at 10° C. 20 to 45
at 20° C. 14 to 25
at 30° C. 2 to 12
at 35° C. 0 to 5

For bakery fat the preferred solids content ($N_T$) is
at 10° C. 30 to 60
at 20° C. 20 to 55
at 30° C. 5 to 35
at 35° C. 0 to 15

The N-lines also allow the application of the fats in the manufacture of ice-cream and candy, e.g of non-CBE candy coatings (CBE=cacao butter equivalent).

The use of intermediate chain saturated fatty acids is to a great extent avoided. The fats of the present invention enable the manufacture of margarine spreads which combine a good spread consistency with the presence of fatty acids of which predominantly are considered more healthy. The fats show an pleasant quick melting behaviour in the 15 to 25° C. range, while low thinness values are attained.

The various embodiments of the invention comprise fats of which the fatty acid distribution over the positions of the glyceride molecule have not been changed by a randomisation treatment.

But, in an alternative embodiment at least a part of the fat of the invention has been subjected to an enzymatic treatment randomizing the fatty acid distribution over the terminal Sn1- and Sn3-positions of the glyceride molecule.

In another embodiment at least a part of the fat incorporated into the fat of the invention has been subjected to an enzymatic treatment randomizing the fatty acid distribution over the Sn1, Sn2 and Sn3 positions of the glyceride molecule. A process for such treatment can be found e.g. in EP patent application 93308864.3.

A further aspect of the invention is the use of the fats according to the above specification for manufacturing a plastic edible fat containing composition.

EXAMPLE 1

The stearin fraction of dry fractionated sheanut oil and fully refined sunflower oil were blended in a ratio of 15:85. The main fatty acids and triglyceride groups of the used stearin fraction of dry fractionated sheanut oil are listed in Table 1.1 and Table 1.2.

TABLE 1.1

| Fatty acids | Overall | 2-position |
|---|---|---|
| $C_{16}$ (Palmitic) | 5.0% | 1.0% |
| $C_{18}$ (Stearic) | 57.8% | 4.7% |
| $C_{18}$:1 (Oleic) | 32.4% | 86.5% |
| $C_{18}$:2 (Linoleic) | 3.0% | 7.7% |

TABLE 1.1-continued

| Fatty acids | Overall | 2-position |
|---|---|---|
| $C_{20}$ (Arachidic) | 1.6% | 0.1% |
| $C_{22}$ (Behenic) | 0.2% | 0.0% |

TABLE 1.2

| Triglyceride group | |
|---|---|
| HOH | 66.0% |
| HHO | 2.0% |
| HLH | 7.4% |
| HHL | 0.0% |
| Rest | 24.6% |

The resulting fat blend had a content of HOH+HHO which is 10.2 wt. % and of HLH+HHL of 1.5 wt. % on total glyceride weight and a content of palmitic acid of about 6 wt. % on total weight of fatty acids.

The solid contents at 5°, 10°, 20°, 30° and 35° C., the N-values, are 14.9, 11.4, 4.4, 0.6 and 0.3 respectively. The N-values can conveniently be measured by means of NMR as described in Fette, Seifen, Anstrichmittel 80, (1978), 180–186 (one hour stabilisation).

Further characteristic features of the fat blend have been summarized in Table 8.

From this fat blend a spread was manufactured. The spread had the following composition (wt. % on total composition):

| FAT PHASE: 80% | |
|---|---|
| 79.5% | fat |
| 0.3% | Cetinol |
| 0.2% | Admul 6203 |
| trace | beta carotene |
| WATER PHASE: 20% | |
| 19.3% | water |
| 0.3% | skimmed milk powder |
| 0.1% | potassium sorbate |
| 0.3% | salt |

The spread was processed at laboratory scale through a conventional A-A-C sequence with a throughput of 4.5 kg/hr, an exit temperature on the second A-unit (800 rpm) of 6.2° C., an exit temperature on the C-unit (250 rpm) of 11.0° C. and a line pressure of 3 bar. A product resulted with unexpectedly good spreadability properties, which is shown by the following "Stevens" values (1 week) at the indicated measuring temperatures:

| S5 | 68 |
|---|---|
| S10 | 58 |
| S15 | 49 |
| S20 | 23 |

The product has good spreadability properties over the complete temperature range from refrigerator temperature to ambient temperature. The product has a good mouthfeel, being very "quick" in the mouth and exhibits excellent melting behaviour due to the very low level of HHH triglycerides and the favourable melting range, with regard to mouth temperature, of the HOH triglycerides. In this respect the product clearly has a better performance than commercially available margarines of which the fat blend comprises a mixture of hydrogenated and/or chemically interesterified components.

The product was very quick in the mouth and exhibited excellent melting behaviour, good spreadability and plasticity. The product showed a thinness value (viscosity at 34° C.) of 74 which is very low compared to average margarines.

COMPARISON EXAMPLE A (based on interesterified fat)

Fully refined sunflower oil and an interesterified mixture of 50 wt. % of fully hardened palm oil and 50 wt. % of fully hardened palm kernel oil were blended in a ratio of 87:13.

A spread was manufactured using the ingredients (except the oil) and the process according to example 1.

The solid contents at 10°, 20°, 30° and 35° C., the N-values, were 12.0, 7.2, 3.2 and 0.6. respectively (one hour stabilisation).

The product exhibited the following "Stevens" values (1 week) at the indicated measuring temperatures:

| | |
|---|---|
| S5 | 86 |
| S10 | 66 |
| S15 | 49 |
| S20 | 26 |

On account of the relatively high content of HHH triglycerides the thinness value is: >150.

From this comparison example it is apparent that the thinness value of the fat of the invention is considerably lower, although the N-lines of examples 1 and A are about the same.

EXAMPLE 2

The stearin fraction of the dry fractionated sheanut oil used in example 1, fully refined high stearic soybean oil and fully refined sunflower oil were blended in a ratio of 17:37:46.

The soybean source is identical to that described by Hammond and Fehr as the A6 germplasm line (Crop Science 23 192–193).

The compositions of the triglyceride and of the fatty acids of this soybean oil is according to Table 2.1.

The resulting fat blend had a content of HOH+HHO which is 16.1 wt. % and of HLH+HHL of 6.7 wt. % on total glyceride weight and a content of palmitic acid of about 7 wt. % on total weight of fatty acids.

The solid contents at 10°, 20°, 30° and 35° C., the N-values, are 30.3,19.4,3.3 and 0.9 respectively (one hour stabilisation).

Further characteristic features of the fat have been summarized in TABLE 8.

TABLE 2.1

| Triglyceride group | High stearic soybean oil |
|---|---|
| HOH | 12.1% |
| HHO | 0.3% |
| HLH | 13.7% |

TABLE 2.1-continued

| Triglyceride group | High stearic soybean oil |
|---|---|
| HHL | 0.3% |
| Rest | 73.6% |

From this fat a spread was manufactured. The spread had the following composition (wt. % on total composition):

| FAT PHASE: 80% | |
|---|---|
| 79.5% | fat |
| 0.3% | Cetinol |
| 0.2% | Admul 6203 |
| trace | beta carotene |
| WATER PHASE: 20% | |
| 19.3% | water |
| 0.3% | skimmed milk powder |
| 0.1% | P sorbate |
| 0.3% | salt |

The spread was processed at laboratory scale through a conventional A-C-A-A-B sequence with a throughput of 4 kg/hr, an exit temperature on the C-unit (150 rpm) of 17.5° C., an exit temperature on the last A-unit (1000 rpm) of 6.1° C., an exit temperature on the B-unit of 11.5° C. and a line pressure of 10 bar. An unexpectedly good wrapper margarine resulted, which though has a good mouthfeel.

The product exhibited the following "Stevens" values (1 week) at the indicated measuring temperatures:

| | |
|---|---|
| S5 | 544 |
| S10 | 459 |
| S15 | 256 |
| S20 | 113 |

Compared with an average margarine the product had a good appearance as expressed by a low gloss and a low yellowness index.

TABLE 8

| | Claimed | Example 1: 15dfSHs/85SF | Example 2: 17dfSHs/37HSBO/46SF |
|---|---|---|---|
| 1) | chemically modified? | no | no |
| a) | $\geq$10% H-fatty acids (H $\geq$ $C_{18}$) | 13.9 | 26.5 |
| b) | S ($C_{18}$) | 12.8 | 24.2 |
| | A ($C_{20}$) | 0.5 | 1.4 |
| | B ($C_{22}$) | 0.6 | 0.9 |
| c) | O ($C_{18}$:1) | 22.3 | 23.9 |
| | L ($C_{18}$:2) | 56.7 | 40.8 |
| d) | $C_{18}$/ ($C_{20}$ + $C_{22}$ + $C_{24}$) $\geq$1, $\geq$5, $\geq$10 | 11.6 | 10.5 |
| e) | $\leq$5% Le ($C_{18}$:3) | 0.3 | 1.8 |
| f) | $\leq$5% trans fatty acids | <0.1 | <0.1 |
| g) | O at 2-pos. $\leq$75%, $\leq$60% | 29.6 | 39.4 |
| h) | $\geq$8% HOH + HHO (H $\geq$ $C_{18}$) | 10.2 | 16.1 |
| i) | $\leq$5% trisaturated TAGs | 0.7 | 1.0 |
| j) | N10 > 10 | 11.4 | 30.3 |
| | N35 $\leq$ 15 | 0.3 | 0.9 |
| | (HOH + HHO) / (HLH + HHL) > 1 (H $\geq$ $C_{18}$) | 6.6 | 2.4 |

TABLE 8-continued

| Claimed | Example 1: 15dfSHs/85SF | Example 2: 17dfSHs/37HSBO/46SF |
|---|---|---|
| 2) N5–N20 ≥ 10 | 10.5 | >15 |
| 3) N10: 11 to 30 | 11.4 | |
| N20: 4 to 15 | 4.4 | |
| N30: 0.5 to 8 | 0.6 | |
| N35: 0 to 4 | 0.3 | |
| 4) N10: 20 to 45 | | 30.3 |
| N20: 14 to 25 | | 19.4 |
| N30: 2 to 12 | | 3.3 |
| N35: 0 to 5 | | 0.9 |
| 5) N10: 30 to 60 | | |
| N20: 20 to 55 | | |
| N30: 5 to 35 | | |
| N35: 0 to 15 | | |
| 6) $C_{12}$–$C_{16}$ ≤ 15%, <10%, ≤ 5% | 6.4 | 6.8 |
| 7) disaturated DAGs ≤5%, ≤3% | <1 | <1 |

EXAMPLE 3

The stearin fraction of the dry fractionated sheanut oil used in example 1 and 45 fully refined sunflower oil were blended in a ratio of 50:50.

The resulting fat blend had a content of HOH+HHO which is 34.0 wt.% and of HLH+HHL of 4.0 wt. % on total glyceride weight and a content of palmitic acid of about 6 wt. % on total weight of fatty acids.

The solid contents at 10°, 20°, 30° and 35° C., the N-values, are 47.9,40.8,24.1 and 3.7 respectively.

Further characteristic features of the fat have been summarized in TABLE 9.

From this fat a bakery margarine was manufactured. The bakery margarine had the following composition (wt. % on total composition):

| FAT PHASE: 83% | |
|---|---|
| 82.7% | fat |
| 0.15% | admul 6203 |
| 0.15% | beta carotene |
| WATER PHASE: 17% | |
| 16% | water |
| 1% | salt |

The bakery margarine was processed at laboratory scale through a conventional A-A-C-B sequence with a throughput of 2.1 kg/hr, an exit temperature on the second A-unit (1000 rpm) of 23.1° C., an exit temperature on the C-unit (200 rpm) of 23.6° C., an exit temperature on the B-unit of 25.8° C. and a line pressure of 10 bar. The margarine was stored at 20° C.

The product exhibited the following "Stevens" values (1 week) at the indicated temperatures:

| S15 | 1207 |
|---|---|
| S20 | 950 |
| S25 | 674 |

The resulted bakery margarine (I) was used in manufacturing croissants according to the following method:

| DOUGH COMPOSITION: | |
|---|---|
| Wheat flour Banket Extra | 2000 g |
| Castor sugar | 60 |
| Pressed yeas | 100 |
| Salt | 40 |
| Dough improver | 60 |
| Water (depending on wheat flour) | 1160 |
| Margarine | 284 |

A dough laminate of 16 layers was formed by two times book folding. The croissant dough pieces have a thickness of 2.5 mm before bending to the typical croissant shape. The dough temperature after lamination was ambient. The dough was proofed at 32° C. for 60 minutes. Then, fresh croissants were baked at 220° C. for 18 minutes.

During lamination the bakery margarine exhibited very good laminating properties.

For comparison a bakery margarine was produced of which the glyceride mixture was obtained by blending the stearin fraction of the dry fractionated sheanut oil, fully hardened palm oil and fully refined sunflower oil in a ratio of 40:10:50. The resulting bakery margarine (II) was used in the manufacturing of croissants according to the method described.

A comparison between the specific volume (S.V.-) values of the baked croissants manufactured with bakery margarine I and those manufactured with bakery margarine II showed that for the croissants baked with margarine I the S.V.-values were from 2 up to 10% higher. Typical examples are given in table 3.1:

TABLE 3.1

| S.V. croissants baked with margarine I (in cm³/g) | S.V. croissants baked with margarine II (in cm³/g) |
|---|---|
| 10.2 | 9.4 |
| 10.1 | 9.3 |

EXAMPLE 4

The stearin fraction of the dry fractionated sheanut oil used in example 1 and fully refined sunflower oil were blended in a ratio of 60:40.

The resulting fat blend had a content of HOH+HHO which is 40.8 wt. % and of HLH+HHL of 4.6 wt. % on total glyceride weight and a content of palmitic acid of about 6 wt. % on total weight of fatty acids.

The solid contents at 10°, 20°, 30° and 35° C., the N-values, are 57.6,51.2,33.3 and 10.9 respectively.

Further characteristic features of the fat have been summarized in Table 9.

A bakery margarine was manufactured from this fat. Tile bakery margarine had the following composition (wt. % on total composition):

| FAT PHASE: 83% | |
|---|---|
| 82.7% | fat |
| 0.15% | Admul 6203 |
| 0.15% | beta carotene |

-continued

| FAT PHASE: 83% | |
|---|---|
| WATER PHASE: 17% | |
| 16% | water |
| 1% | salt |

The bakery margarine was processed at laboratory scale through a conventional A-A-C-B sequence with a throughput of 2.2 kg/hr, an exit temperature on the second A-unit (1000 rpm) of 23.8° C., an exit temperature on the C-unit (200 rpm) of 25.5° C., an exit temperature on the B-unit of 28.5° C. and a line pressure of 15 bar. The margarine was stored at 30° C.

The product exhibited the following "Stevens" values (1 week) at the indicated temperatures:

| S15 | 3711 |
|---|---|
| S20 | 2672 |
| S25 | 1592 |

The relatively high hardness level of the product indicated by the Stevens values makes the product pre-eminently suitable to be used in a tropical application.

The resulted bakery margarine (I) was used in manufacturing croissants according to the method described in example 3 with the exception that the dough temperature after lamination was 28.6° C.

During lamination the bakery margarine exhibited good laminating properties.

For comparison a bakery margarine was produced of which the glyceride mixture was obtained by blending the stearin fraction of the dry fractionated sheanut oil, fully hardened palm oil and fully refined sunflower oil in a ratio of 50:10:40. The resulting bakery margarine (II) was also used in the manufacturing of croissants according to the method described.

A comparison between the S.V. values of the baked croissants manufactured with bakery margarine I and those manufactured with bakery margarine II showed that the S.V. values of the croissants baked with margarine I were from 4 up to 12% higher. Typical examples are given in table 4.1:

TABLE 4.1

| S.V. croissants baked with margarine I (in cm³/g) | S.V. croissants baked with margarine II (in cm³/g) |
|---|---|
| 8.6 | 7.9 |
| 8.7 | 7.8 |

TABLE 9

| Claimed | | Example 3: 50dfSHs/50SF | Example 4: 60dfSHs/40SF |
|---|---|---|---|
| 1) | chemically modified? | no | no |
| a) | >10% H-fatty acids ($H \geq C_{18}$) | 32.9 | 38.1 |
| b) | S ($C_{18}$) | 31.4 | 36.6 |
| | A ($C_{20}$) | 1.0 | 1.1 |
| | B ($C_{22}$) | 0.5 | 0.4 |
| c) | O ($C_{18}$:1) | 26.5 | 27.6 |
| | L ($C_{18}$:2) | 34.6 | 28.3 |
| d) | $C_{18}/(C_{20} + C_{22} + C_{24}) \geq 1, \geq 5, \geq 10$ | 20.9 | 24.4 |
| e) | ≤5% Le ($C_{18}$:3) | 0.2 | 0.2 |
| f) | ≤5% trans fatty acids | <0.1 | <0.1 |
| g) | O at 2-pos. ≤75%, ≤60% | 53.0 | 59.7 |
| h) | ≥8% HOH + HHO (H ≥ $C_{18}$) | 34.0 | 40.8 |
| i) | ≤5% trisaturated TAGs | 2.3 | 2.7 |
| j) | N10 > 10 | 47.9 | 57.6 |
| | N35 ≤ 15 | 3.7 | 10.9 |
| | (HOH + HHO)/(HLH + HHL) > 1 (H ≥ $C_{18}$) | 8.6 | 8.8 |
| 2) | N5–N20 ≥ 10 | ≈11 | ≈10 |
| 3) | N10: 11 to 30 N20: 4 to 15 N30: 0.5 to 8 N35: 0 to 4 | | |
| 4) | N10: 20 to 45 N20: 14 to 25 N30: 2 to 12 N35: 0 to 5 | | |
| 5) | N10: 30 to 60 | 47.9 | 57.6 |
| | N20: 20 to 55 | 40.8 | 51.2 |
| | N30: 5 to 35 | 24.1 | 33.3 |
| | N35: 0 to 15 | 3.7 | 10.9 |
| 6) | $C_{12}$–$C_{16}$ ≤ 15%, ≤ 10%, ≤ 5% | 5.9 | 5.7 |
| 7) | disaturated DAGs ≤ 5%, ≤3% | <1.2 | <1.5 |

EXAMPLE 5

A stearin fraction (BO stearin 1) of a high stearic soybean oil was obtained by dry fractionation. The solid phase content of the slurry was 8% (determined by NMR).

The overall fatty acid compositions of the soybean oil and the obtained stearin fraction are listed in Table 5.1. This high stearic soybean oil was obtained from PIONEER (Johnston, Iowa, USA).

The triglyceride groups of the used stearin fraction are listed in Table 5.2.

TABLE 5.1

| Fatty acids | High stearic soybean oil | Stearin fraction of high stearic soybean oil (BO stearin 1) |
|---|---|---|
| $C_{16}$ (Palmitic) | 8.8% | 6.6% |
| $C_{18}$ (Stearic) | 18.4% | 38.4% |
| $C_{18}$:1 (Oleic) | 16.9% | 12.5% |
| $C_{18}$:2 (Linoleic) | 44.7% | 33.9% |
| $C_{18}$:3 (Linolenic) | 9.1% | 6.6% |
| $C_{20}$ (Arachidic) | 1.1% | 1.5% |
| $C_{22}$ (Behenic) | 0.4% | 0.4% |

TABLE 5.2

| Triglyceride group | Stearin fraction of high stearic soybean oil (BO stearin 1) |
|---|---|
| HHH | <1.0% |
| HOH | 8.8% |
| HHO | 0.4% |
| HLH | 29.1% |

TABLE 5.2-continued

| Triglyceride group | Stearin fraction of high stearic soybean oil (BO stearin 1) |
|---|---|
| HHL | 0.5% |
| Rest | 60.2% |

The stearin fraction of dry fractionated soybean oil, the stearin fraction of the dry fractionated sheanut oil described in example 1 and fully refined sunflower oil were blended in a ratio of 37.5: 14 : 48.5.

The resulting fat blend had a content of HOH+HHO which is 13 wt. % and of HLH+HHL of 12.3 wt. % on total glyceride weight and a content of palmitic acid of about 6 wt. % on total weight of fatty acids.

The solid contents at 5°, 10°, 20°, 30° and 35° C., the N-values, were 31.4,28.5, 19.3,2.1 and <0.5 respectively (one hour stabilisation).

Further characteristic features of the fat have been summarized in TABLE 10.

From this fat a wrapper margarine was manufactured with a composition as described in example 1.

The spread was processed at laboratory scale through an A-C-A-B sequence with a throughput of 3.6 kg/hr, an exit temperature on the C-unit (150 rpm) of 9.9° C., an exit temperature on the second A-unit (600 rpm) of 8.0° C. and a line pressure of 13 bar. A good product resulted.

The product exhibited the following "Stevens" values (1 week) at the indicated measuring temperatures:

| | |
|---|---|
| S5 | 507 |
| S10 | 453 |
| S15 | 269 |
| S20 | 86 |

TABLE 10

| Claimed | | Example 5: 14dfSHs/ 48.5SF/37.5BO stearin 1 | Example 6: 12dfSHs/ 24BO/36SF/ 28BO stearin1 | Example 7: 11dfSHs/ 66SF/23BO stearin 2 |
|---|---|---|---|---|
| 1) | chemically modified? | no | no | no |
| a) | $\geq 10\%$ H-fatty acids (H $\geq$ C$_{18}$) | 26.2 | 21.6 | 19.0 |
| b) | S (C$_{18}$) | 25.0 | 20.5 | 17.7 |
| | A (C$_{20}$) | 0.9 | 0.8 | 0.7 |
| | B (C$_{22}$) | 0.3 | 0.3 | 0.5 |
| c) | O (C$_{18}$:1) | 21.0 | 21.5 | 22.7 |
| | L (C$_{18}$:2) | 43.2 | 45.0 | 49.5 |
| d) | C$_{18}$/ (C$_{20}$ + C$_{22}$ + C$_{24}$) $\geq 1, \geq 5, \geq 10$ | 20.8 | 18.6 | 14.8 |
| e) | $\leq 5\%$ Le (C$_{18}$:3) | 2.7 | 3.7 | 2.0 |
| f) | $\leq 5\%$ trans fatty acids | <0.1 | <0.1 | <0.1 |
| g) | O at 2-pos. $\leq 75\%$, $\leq 60\%$ | 23.4 | 24.3 | 29.4 |
| h) | $\geq 8\%$ HOH + HHO (H $\geq$ C$_{18}$) | 13.0 | 10.7 | 9.2 |
| i) | $\leq 5\%$ trisaturated TAG's | 1.0 | 0.8 | 0.7 |
| j) | N10 > 10 | 28.5 | 21.3 | 16.4 |
| | N35 $\leq$ 15 | <0.5 | <0.5 | <0.5 |
| | (HOH + HHO) / (HLH + HHL) > 1 (H $\geq$ C$_{18}$) | 1.1 | 1.1 | 1.4 |
| 2) | N5–N20 $\geq$ 10 | 12.1 | 11.4 | 10.2 |
| 3) | N10: 11 to 30 | | 21.3 | 16.4 |
| | N20: 4 to 15 | | 13.4 | 9.0 |
| | N30: 0.5 to 8 | | 0.8 | 0.6 |
| | N35: 0 to 4 | | <0.5 | <0.5 |
| 4) | N10: 20 to 45 | 28.5 | | |
| | N20: 14 to 25 | 19.3 | | |
| | N30: 2 to 12 | 2.1 | | |
| | N35: 0 to 5 | <0.5 | | |
| 5) | N10: 30 to 60 | | | |
| | N20: 20 to 55 | | | |
| | N30: 5 to 35 | | | |
| | N35: 0 to 15 | | | |
| 6) | C$_{12}$–C$_{16}$ $\leq$ 15%, $\leq$ 10%, $\leq$5% | 6.2 | 7.4 | 6.5 |
| 7) | disaturated DAGs $\leq$5%, $\leq$3% | <1.0 | <1.0 | <1.0 |

EXAMPLE 6

The stearin fraction (BO stearin 1) of dry fractionated high stearic soybean oil described in example 5, the stearin fraction of the dry fractionated sheanut oil described in example 1, fully refined soybean oil and fully refined sunflower oil were blended in a ratio of 28:12:24:36.

The resulting fat blend had a content of HOH+HHO which is 10.7 wt. % and of HLH+HHL of 9.4 wt. % on total glyceride weight and a content of palmitic acid of about 7 wt. % on total weight of fatty acids.

The solid contents at 5°, 10°, 20°, 30° and 35° C., the N-values, were 24.8, 21.3, 13.4, 0.8 and <0.5 respectively (one hour stabilisation).

Further characteristic features of the fat have been summarized in TABLE 10.

From this fat a tub margarine was manufactured with a composition as described in example 1.

The spread was processed at laboratory scale through an A-C-A-C sequence with a throughput of 4.5 kg/hr, an exit temperature on the second A-unit (600 rpm) of 8.1 ° C., an exit temperature on the second C-unit (250 rpm) of 1 1.5° C. and a line pressure of 15 bar. A good product resulted.

The product exhibited the following "Stevens" values (1 week) at the indicated measuring temperatures:

| | |
|---|---|
| S5 | 433 |
| S10 | 390 |
| S15 | 233 |
| S20 | 62 |

The product was very quick in the mouth and exhibited excellent melting behaviour, good spreadability and plasticity. The product showed a thinness value (viscosity at 34° C.) of 64 which is very low compared to average margarines.

COMPARISON EXAMPLE B (based on tropical oils)

Dry fractionated palm oil stearin, palm kernel oil, palm oil and soybean oil were blended in a ratio of 13:15:25:47.

A spread was manufactured using the ingredients (except the oil) and the process according to example 6.

The solid contents at 5°, 10°, 20°, 30° and 35° C., the N-values, were 31.6, 23.8, 12.5, 6.6 and 3.6 respectively (one hour stabilisation).

The product exhibited the following "Stevens" values (1 week) at the indicated measuring temperatures:

| S5  | 547 |
| S10 | 344 |
| S15 | 151 |
| S20 | 41  |

Thinness value of 360. While the N-line is comparable with the N-line of example 6, the melting behaviour (thinness value) of the example 6 margarine is much better.

EXAMPLE 7

A stearin fraction (BO stearin 2) was obtained by dry fractionation from the same high stearic soybean oil mentioned in examples 5 and 6. The solid phase content of the slurry was 8% (determined by NMR).

The overall fatty acid composition of the obtained stearin fraction is listed in Table 7.1.

TABLE 7.1

| Fatty acids | Stearin fraction of high stearic soybean oil (BO stearin 2) |
|---|---|
| $C_{16}$ (Palmitic) | 7.2% |
| $C_{18}$ (Stearic) | 33.6% |
| $C_{18}$:1 (Oleic) | 13.7% |
| $C_{18}$:2 (Linoleic) | 36.5% |
| $C_{18}$:3 (Linolenic) | 7.1% |
| $C_{20}$ (Arachidic) | 1.4% |
| $C_{22}$ (Behenic) | 0.4% |

The triglyceride groups of the used stearin fraction are listed in Table 7.2.

TABLE 7.2

| Triglyceride group | Stearin fraction of high stearic soybean oil (BO stearin 2) |
|---|---|
| HHH | <1.0% |
| HOH | 7.2% |
| HHO | 0.2% |
| HLH | 23.5% |
| HHL | 0.4% |
| Rest | 67.7% |

The BO stearin 2, the stearin fraction of the dry fractionated sheanut oil described in example 1 and fully refined sunflower oil were blended in a ratio of 23:11:66.

The resulting fat blend had a content of HOH+HHO which is 9.2 wt. % and of HLH+HHL of 6.6 wt. % on total glyceride weight and a content of palmitic acid of about 6.5 wt. % on total weight of fatty acids.

The solid contents at 5°, 10°, 20°, 30° and 35° C., the N-values, were 19.2, 16.4, 9.0, 0.6 and <0.5 respectively (one hour stabilisation).

Further characteristic features of the fat have been summarized in TABLE 10.

From this fat a spread was manufactured with a composition as described in example 1.

The spread was processed at laboratory scale through a convential A-A-C sequence with a throughput of 4.5 kg/hr, an exit temperature on the second A-unit (600 rpm) of 8.4° C., an exit temperature on the C-unit (100 rpm) of 12.1° C. and a line pressure of 1 bar. A good product resulted.

The product exhibited the following "Stevens" values (1 week) at the indicated measuring temperatures:

| S5  | 247 |
| S10 | 217 |
| S15 | 136 |
| S20 | 49  |

The product was very quick in the mouth and exhibited excellent melting behaviour, good spreadability and plasticity. The product showed a thinness value (viscosity at 34° C.) of 62 which is very low compared to average margarines.

COMPARISON EXAMPLE C (based on tropical oils)

Dry fractionated palm oil stearin, dry fractionated palm kernel stearin and sunflower oil were blended in a ratio of 15:7:78.

A spread was manufactured using the ingredients (except the oil) and the process according to example 7.

The solid contents at 5°, 10°, 20°, 30° and 35° C., the N-values, were 16.3, 13.5, 9.6, 5.2 and 5.0 respectively (one hour stabilisation).

The product exhibited the following "Stevens" values (1 week) at the indicated measuring temperatures:

| S5  | 72 |
| S10 | 49 |
| S15 | 35 |
| S20 | 27 |

Thinness value of 282.

While the N-line is comparable with the N-line of example 7, the melting behaviour (thinness value) of the example 7 margarine is much better.

We claim:

1. Glyceride fat which comprises a mixture of glycerides originating from seed oils which have not substantially been subjected to chemical modification, the glycerides containing both saturated and unsaturated fatty acids consisting of:
   (a) at least 10 wt. % of $C_{18}$–$C_{24}$ saturated fatty acids
   (b) which comprise stearic and/or arachidic and/or behenic acid and/or lignoceric acid
   (c) oleic and/or linoleic acid, while
   (d) the ratio of saturated $C_{18}$-acid/saturated ($C_{20}$+$C_{22}$+$C_{24}$)-acids is $\geq 1$,
   which glycerides contain calculated on total fatty acid weight
   (e) $\leq 5$ wt. % of linolenic acid
   (f) $\leq 5$ wt. % of trans fatty acids
   (g) $\leq 75$ wt. % of oleic acid on total fatty acids on position 2 of the glyceride molecule
   which glycerides contain calculated on total glycerides weight
   (h) $\geq 8$ wt. % of HOH+HHO triglycerides
   (i) $\leq 5$ wt. % of trisaturated triglycerides
   (j) which glycerides have a solids content comprising $N_{10}>10$ and $N_{35}\leq 15$
   (k) which glycerides have a content of $C_{12}$–$C_{16}$ fatty acid $\leq 10$ wt. % calculated on total fatty acid weight, and which is characterized in that the ratio of (HOH+HHO) and (HLH+HHL) triglycerides >1, where H is a saturated $C_{18}$–$C_{24}$ fatty acid residue, O is an oleic acid residue and L is a linoleic acid residue the glyceride fat being suitable for use in preparing a plastic edible fat containing composition.

2. Glyceride fat according to claim 1, where the ratio of (HOH+HHO) and (HLH+HHL) triglycerides is 1-9.

3. Glyceride fat according to claim 1 where $N_5$–$N_{20}$>10.

4. Glyceride fat according to claim 1 which are suitable for the production of tub margarine, which has a solids content ($N_T$)

at 10° C. of 11 to 30 at 20° C. of 4 to 15 at 30° C. of 0.5 to 8 at 35° C. of 0 to 4.

5. Glyceride fat according to claim 1 which are suitable for the production of wrapper margarine, which has a solids content ($N_T$)

at 10° C. of 20 to 45 at 20° C. of 14 to 25 at 30° C. of 2 to 12 at 35° C. of 0 to 5.

6. Glyceride fat according to claim 1 which are suitable for use as a bakery fat, which has a solids content ($N_T$)

at 10° C. of 30 to 60 at 20° C. of 20 to 55 at 30° C. of 5 to 35 at 35° C. of 0 to 15.

7. Glyceride fat according to claim 1, which has a content of ≦5 wt. % of disaturated diglycerides calculated on total glycerides weight.

8. Glyceride fat according to claim 1, obtained wholly or partially from genetically modified soybean, corn, olive, rape, safflower or sunflower plants.

9. Glyceride fat according to claim 1 which has the following fatty acid composition <8% $C_{12}$–$C_{16}$ fatty acids >25% stearic acid <5% saturated $C_{20}$+$C_{22}$+$C_{24}$ fatty acids the balance essentially being oleic and linoleic acid.

10. Glyceride fat according to claims 1, where the mixture of glycerides includes a dry fractionated fat blend.

11. Glyceride fat according to claim 10, where the dry fractionated fat blend is the stearin fraction of a dry fractionated high stearic soybean oil.

12. Glyceride fat according to claim 1 which possesses a fatty acid distribution which is non-random.

13. Glyceride fat according to claim 1, where the mixture of glycerides includes a fat blend which has been subjected to an enzymatic interesterification treatment randomizing the fatty acid distribution over the terminal Sn1- and Sn3- positions of the glyceride molecule.

14. Glyceride fat according to claim 1, where the mixture of glycerides includes a fat blend which has been subjected to an enzymatic interesterification treatment randomizing the fatty acid distribution over the Sn1-, Sn2- and Sn3- positions of the glyceride molecule.

15. Plastic edible fat containing composition comprising 1–100% fat phase and 0–99% aqueous phase, wherein the fat phase is constituted by the fat according to claim 1.

16. A plastic edible fat containing composition according or claim 15, wherein the composition is a margarine or spread product comprising 40–80% of fat phase and 20–60% of aqueous phase.

17. Glyceride fat according to claim 1 which are suitable for the production of tub margarine having quick melting behavior in the mouth.

18. Glyceride fat according to claim 1 which have quick melting behavior in the 15 to 25° C. range.

19. Glyceride fat in accordance with claim 1, which has a solids content ($N_T$)

at 10° C. of 11 to 30;

at 20° C. of 4 to 15;

at 30° C. of 0.5 to 8;

at 35° C. of 0 to 4.

20. Glyceride fat according to claim 1 which has a solids content ($N_T$)

at 10° C. of 20 to 45;

at 20° C. of 14 to 25;

at 30° C. of 2 to 12;

at 35° C. of 0 to 5.

21. Fat triglyceride according to claim 1 which has a solids content ($N_T$)

at 10° C. of 30 to 60;

at 20° C. of 20 to 55;

at 30° C. of 5 to 35;

at 35° C. of 0 to 15.

* * * * *